Aug. 18, 1953     J. F. BLACK     2,649,011

ANALYTICAL SAMPLE CELL

Filed July 29, 1949

James F. Black Inventor

By W. O. J. Heilman Attorney

Patented Aug. 18, 1953

2,649,011

UNITED STATES PATENT OFFICE 2,649,011

ANALYTICAL SAMPLE CELL

James F. Black, Roselle, N. J., assignor to Standard Oil Development Company, a corporation of Delaware Application July 29, 1949, Serial No. 107,511

2 Claims. (Cl. 88—14)

This invention relates to an improved type of analytical sample cell particularly adapted for use in determining the radiation absorbing or transmitting characteristics of a sample. In accordance with this invention a sample cell is provided, adapted to hold a fluid to be subjected to radiant energy, in such a manner that the thickness of the sample cell can be variably controlled.

A common analytical technique at the present time is to pass radiation through a sample of fluid to be analyzed so as to determine the radiation absorbing, or transmitting characteristics of the fluid. The radiation employed may fall in the ultra-violet region, the infra-red region, or other portions of the radiation spectrum, while the fluid to be characterized may be either a gas or a liquid. For a number of reasons it is often desirable to variably control the thickness of the sample cell in which the fluid is contained. This invention is, therefore, directed to the provision of a sample cell to contain fluids to be subjected to radiation, of such a nature that the thickness of the sample cell may conveniently be varied.

In order to more clearly bring out the object of this invention reference may be made to infra-red analysis technique. In infra-red spectrometry, a cell suitable for obtaining a suitable spectra, must have a suitable thickness and must be of such a character as to permit infra-red transmission through the sample of detectable quantities of infra-red energy while providing discernible infra-red absorption characteristics. Thus the sample cell must be infra-red transparent, and the cell must be sufficiently thin so that detectable infra-red energy will pass through the sample contained in the cell. At the same time the cell must be sufficiently thick so that sufficient infra-red adsorption occurs on the part of the sample contained in the cell to provide a distinctive infra-red adsorption spectrum. For many purposes it is suitable to utilize cells of fixed dimensions. However, this frequently necessitates replacing one cell with a different cell of a different thickness, and in some cases makes it impossible to obtain desired analytical results due to the impossibility of obtaining a cell of exactly the optimum thickness, for a particular purpose.

Again, in double beam infra-red spectrometers, effectively two sample cells are used one being positioned in each of the beams. If analysis is to be made of compound A, dissolved in fluid B, contained in one of the sample cells, it is necessary to fill the other of the sample cells with a comparable thickness of fluid B. To exactly attain this condition, it is clearly necessary to be able to vary the thickness of at least one of the sample cells, so that the adsorbing characteristics of fluid B may be exactly compensated in each of the two beams.

As will be appreciated by those skilled in the art, therefore, for these and other reasons, it is highly desirable to provide a radiation transparent cell for analytical work, having a variable cell thickness.

The sample cell of this invention embodies a novel principle in order to attain the desired variation in the sample cell thickness. In the conventional cells heretofore used, radiation has been transmitted directly through the cell so that the effective thickness of the cell is the distance between the transparent faces of the cell. However, in the sample cell of this invention, a reflector is provided in the cell which may be adjustably positioned with respect to a transparent face of the cell so that the effective thickness of the cell is twice the distance between the reflector, and the transparent face of the cell. In other words, the sample cell of this invention is characterized by the transmission of light through a transparent face to a reflecting surface in the cell from which the light is reflected outwardly back through the transparent face. The nature of this sample cell may be fully understood from a consideration of the appended drawing, in connection with the following description.

Figure 1:
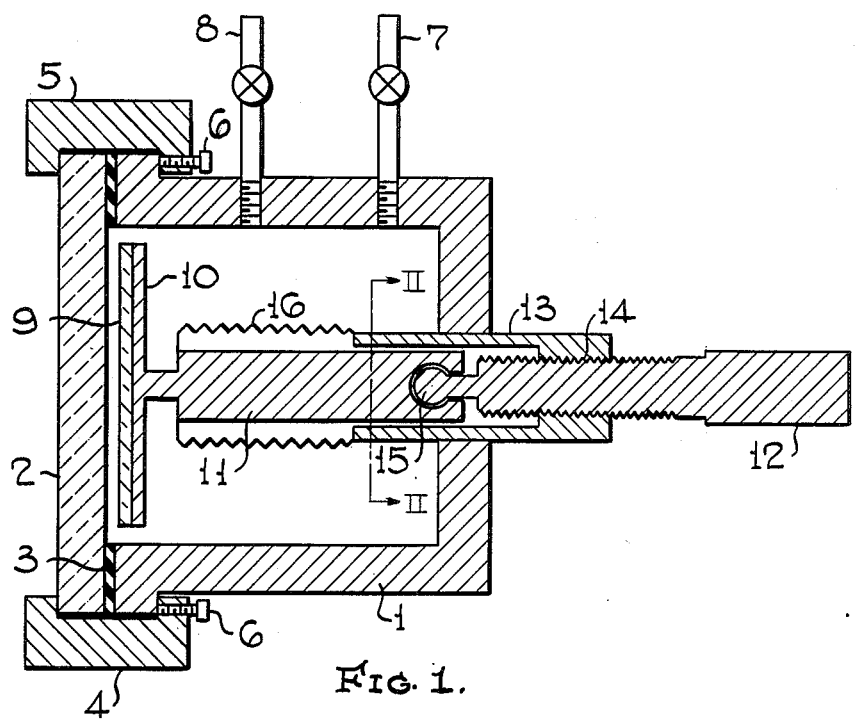
Fig. 1 is a cross-sectional elevation of a sample cell.
Figure 2:
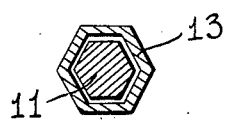
Fig. 2 is a view taken along section II—II of Figure 1.

Referring now to the drawing, which diagrammatically illustrates in cross-sectional elevation a suitable embodiment of the sample cell of this invention, the number 1 designates a casing comprising the body of the sample cell. This housing may conveniently be composed of metal, and may if desired be made in a cylindrical shape having one end of the cylinder open for the accommodation of the transparent window 2, and having the other end of the cylinder closed. The transparent window 2, consists of any material which is radiation transparent; that is, which is transparent to radiation of the particular wave length to be utilized. For example, if the cell is to be used for infra-red analysis work the transparent window may consist of a rock-salt plate. This window may be maintained in fluid tight relation with the housing 1, by positioning a gasket 3 between the housing, and the window, and by forcing the window 2 against the gasket and housing by means of the clamps 4 and 5. As illustrated, these clamps may consist of C clamps, utilizing the screws 6 as the clamping means. Fluid may be introduced to the housing 1 by means of a suitable fluid opening 7, which may be valved so as to permit the controlled flow of fluid into the housing and similarly will permit introduction and maintenance of the fluid in the sample cell at any desired pressures. A vent 8 which may also be valved, is provided to permit the exhaust of air from the housing as the fluid is introduced through inlet 7. Positioned within the housing, parallel to the transparent window 2, is the reflecting surface 9, which may, for example, be a back-silvered radiation transparent plate. For example, the reflector 9 may consist of a rock-salt plate, the back of which is silvered in the ordinary manner. This reflector may suitably be held in position by sealing or clamping the reflector to a metal disc 10, which in turn is supported by the shaft 11. The shaft 11 is provided with a micrometer drive 12 and associated elements so that the reflector 9 may be moved towards, or may be moved away from the transparent window 2. For this purpose a guide member 13 is fitted in a central opening in the housing 1, so as to be in fluid tight relation therewith. If desired the guide member 13 may be made an integral part of the housing 1. This guide member is provided with internal threads 14 to co-act with the threads provided on the micrometer drive 12. The remainder of the guide is of sufficiently large internal diameter so as to permit the shaft 11 to move freely therein. It is desirable that a key and a keyway be provided on shaft 11 and guide 13, or alternatively, that these elements be polygonal in cross section. By maintaining a small tolerance between the diameter of the shaft 11, and the internal surface of the guide 13, rod 11 may be moved within the guide 13 so as to maintain the reflector 9 in parallel alignment with the transparent window 2. A ball and socket connection 15 may be provided between the micrometer drive 12, and the shaft 11 so that rotation of drive 12 will not rotate shaft 11, but will move the shaft either towards, or away from the window 2. Finally a suitable metallic, fabric, leather or plastic fluid tight bellows 16 is sealed to the end of the shaft 11, and the end of the mirror guide 13 or directly to the housing 1, so as to prevent fluid from entering the space between the guide 13, and the rod 11, and further so as to contain a lubricant within this space.

In operating the sample cell illustrated, the valve of vent 8 is opened and the valve in inlet 7 is opened so as to permit the flow of fluid into the housing 1. When the fluid has been introduced in this manner, the valve in inlet line 7 is closed permitting the fluid to remain in the housing. Thereafter by rotation of micrometer screw 12, the proximity of the reflector 9 to the transparent face 2, may be adjustably controlled. Consequently, the effective fluid thickness of the sample cell, provided by this arrangement, is the distance between the transparent window 2, and the reflector 9. By positioning this sample cell in suitable combination with a conventional radiation analytical apparatus, analyses may be conducted according to the conventional procedures. It is apparent that in utilizing this sample cell, minor alterations in the assembly of the radiation source, and radiation detector are required, as these must be arranged so that radiation from the source may be transmitted towards the sample cell for reflection from the reflector 9, so as to impinge on the radiation detector. This may readily be achieved if desired by utilizing auxiliary mirrors to alter the radiation path in a conventional type of instrument.

What is claimed is:

1. An optical cell consisting of a fluid housing including a transparent face plate, a threaded drive rod maintained in threaded relation through said housing extending toward the face plate, a reflecting plate, means coupled to said drive rod supporting said reflecting plate parallel to said face plate, and a bellows encircling said supporting means and sealed in fluid tight relation to said housing.

2. The cell defined by claim 1 in which the said supporting means includes a guide member fixed to the housing cooperating with the supporting means to maintain the reflecting plate in sliding, non-rotational relation with respect to said guide means.

JAMES F. BLACK.

References Cited in the file of this patent

UNITED STATES PATENTS

| Number | Name | Date |
|---|---|---|
| 1,967,583 | McFarlane et al. | July 24, 1934 |
| 2,486,930 | De Giers et al. | Nov. 1, 1949 |

FOREIGN PATENTS

| Number | Country | Date |
|---|---|---|
| 489,880 | Germany | Jan. 20, 1930 |

OTHER REFERENCES

Article in "Journal of Scientific Instruments," "Variable Path-Length Cell for the Measurement of the Absorption of Liquids in the Infra Red Region of the Spectrum" by Gordon and Powell, vol. 22, January 1945, pages 12, 13, 14.

Publication "Journal of Optical Society of America," vol. 37, No. 10, October 1947, Article "Selective Infra Red Analyzers" by Fastie and Pfund, pages 762–768.